United States Patent
Tanegashima et al.

[15] 3,679,864
[45] July 25, 1972

[54] ELECTRODE FEED USING PLURAL MOTORS HAVING CONSTANT SPEED DROOPING CHARACTERISTICS

[72] Inventors: Kenichiro Tanegashima, Ikeda-shi; Makoto Kobayashi, Nishinomiya-shi; Shinichiro Kudo, Kawanishi-shi, all of Japan

[73] Assignee: Matsushita Electric Industrial Co., Ltd., Osaka, Japan

[22] Filed: Dec. 22, 1969

[21] Appl. No.: 887,044

[30] Foreign Application Priority Data

Dec. 26, 1968 Japan..........................................44/689

[52] U.S. Cl..................................219/130, 219/69, 219/72, 226/108, 226/181
[51] Int. Cl..................................................................B23k 9/00
[58] Field of Search..................219/130, 74; 228/184, 181, 228/108; 314/68, 69, 72

[56] References Cited

UNITED STATES PATENTS

| | | | |
|---|---|---|---|
| 2,790,925 | 4/1957 | Landis et al. | 314/69 |
| 3,279,669 | 10/1966 | Bernard et al. | 226/181 |
| 3,293,477 | 12/1966 | Lobosco | 219/130 X |
| 3,344,305 | 9/1967 | Ogden et al. | 219/130 X |
| 3,396,888 | 8/1968 | Rygiol | 226/181 X |
| 3,443,145 | 5/1969 | Margrain | 219/130 X |
| 3,506,174 | 4/1970 | Shuey, Jr. | 226/108 |
| 2,636,102 | 4/1953 | Lobosco | 219/131 |
| 3,249,839 | 5/1966 | Fay | 318/345 |
| 3,414,791 | 12/1068 | Munson et al. | 318/345 |

Primary Examiner—R. F. Staubly
Assistant Examiner—George A. Montanye
Attorney—Stevens, Davis, Miller & Mosher

[57] ABSTRACT

A semi-automatic or automatic welding apparatus using two or more motors having drooping characteristics approximating constant speed for feeding a consumable welding electrode wire, wherein the distance from a wire reel to a welding torch is increased, and the portable portion reduced in size and weight, whereby the maneuverability and portability of the semi-automatic or automatic welding apparatus are improved and the stability of the wire feed is enhanced.

2 Claims, 4 Drawing Figures

PATENTED JUL 25 1972

K. TANEGASHIMA
M. KOBAYASHI
AND S. KUDO
INVENTORS

BY Stevens, Davis, Miller &
Mosher
ATTORNEYS

ELECTRODE FEED USING PLURAL MOTORS HAVING CONSTANT SPEED DROOPING CHARACTERISTICS

The present invention relates to a semi-automatic or an automatic apparatus using two or more motors for feeding a consumable welding electrode wire (hereinafter referred to as a wire for simplicity), wherein the distance from a wire reel to a welding torch is increased and the portable portion reduced in size and weight, so as to improve the maneuverability and portability of semi-automatic or automatic welding apparatus and to enhance the stability of the wire feed.

Figure 1:
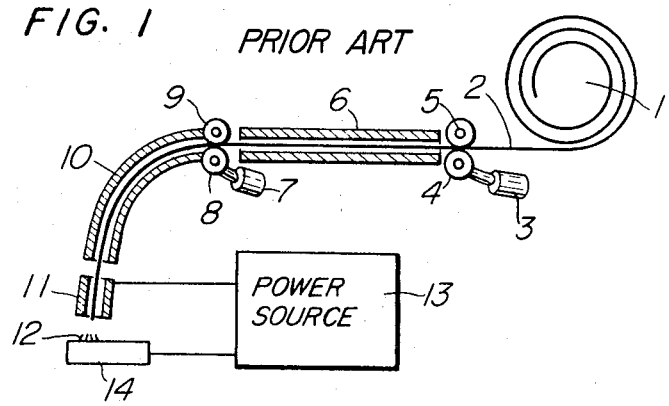
FIG. 1 is a view schematically showing the construction of a conventional welding apparatus.

It is already known to employ two or more motors for feeding a wire, for the purpose of increasing the distance from a wire reel to a welding torch. Namely, as shown in FIG. 1, a wire 2 drawn from a wire coil 1 is introduced into a first guide tube 6 by the co-action of a first feed roller 4, driven from a first feed motor 3, and a press roller 5, and then into a second guide tube 10 with a force imparted thereto by a second feed roller 8, driven from a second feed motor 7, and a co-operating second press roller 9 which are provided between the exit end of the first guide tube 6 and the entrance end of the second guide tube 10, and which are finally fed to an arc portion 12 through a contact tip 11 of the torch. A welding current flows from one of the output terminals of a power source 13 to the other output terminal of the same through the contact tip 11 of the torch, the wire 2, the arc portion 12 and a material 14 to be welded.

Figure 2:
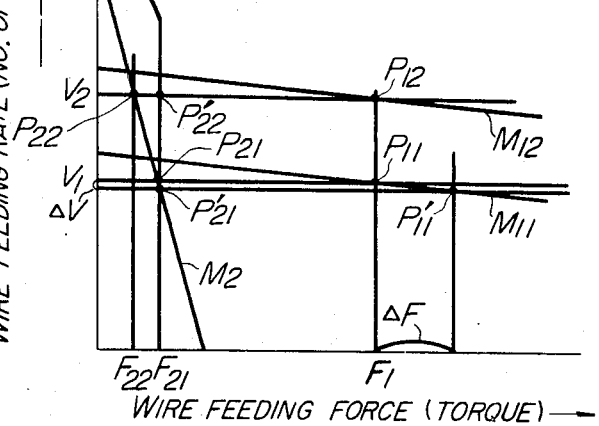
FIG. 2 is a diagram showing the relationship between the wire feeding force and the wire feeding rate in the conventional welding apparatus.

In a conventional welding apparatus of the type described above, two motors of the characteristics shown in FIG. 2 have been used in combination, so as to obtain a smooth wire feed.

FIG. 2 is a diagram showing the relationship between the wire feeding force and the wire feeding rate of each motor (including the feed roller), wherein $M_{11}$, $M_{12}$ represent the characteristic of the first feed motor and $M_2$ represents the characteristic of the second feed motor.

The second feed motor is occasionally of the characteristic represented by $M_2'$. With reference to FIG. 2, if the operational characteristic of the first feed motor is set as represented by the line $M_{11}$ and the characteristic of the second feed motor as represented by the line $M_2'$, the force F required for feeding the wire will be the sum of the force $F_1$ imparted by the first feed motor and the force $F_{21}$ imparted by the second feed motor, i.e. $F_1 + F_{21}$, and the wire feeding rate will be $V_1$.

The force F required for feeding the wire is variable depending upon the lengths and bending degrees of the first guide tube and the second guide tube, and the wire diameter. Therefore, if the bending degree of each guide tube varies in the welding operation, the force F will be changed accordingly.

When the force F required for feeding the wire is increased by $\Delta F$, the operational position of this prior art apparatus is shifted from the point $P_{11}$ to the point $P'_{11}$ on the characteristic line $M_{11}$ in FIG. 2, so that the wire feeding rate is decreased by $\Delta V$ and the feeding force of the first feed motor is increased by $\Delta F$.

When the second feed motor is of the characteristic $M_2'$, the feeding force thereof remains at $F_{21}$, whereas when it is of the characteristic $M_2$, the operating point moves from the point $P_{21}$ to the point $P'_{21}$ and the wire feeding force is slightly increased from $F_{21}$. However, since the drooping degree of $M_2$ is generally selected to be large, the increase is small and the wire feeding force can be regarded essentially as $F_{21}$.

Further, it is usual that the drooping degree of the operational characteristic line $M_{11}$ of the first feed motor is small or, in other words, the value of $\Delta V/\Delta F$ is small so that the value of $\Delta V$ will not give a substantial effect on the welding operation in relation to the value of $\Delta F$ which occurs under normal welding operation. In order to change the wire feeding rate, the operational characteristic line of the first feed motor is reset at $M_{12}$ from $M_{11}$, whereby the wire feeding rate is elevated to $V_2$ and the feeding force imparted to the wire becomes the sum of $F_1$ created by the first feed motor and $F_{21}$ or $F_{22}$ created by the second feed motor.

As stated above, in the conventional welding apparatus of the type using two or more wire feed motors, a motor (including its control element) having a wire feeding rate vs. wire feeding force characteristic of a small drooping degree (a characteristic approximating the constant speed characteristic) has been combined with a motor characterized by a large drooping degree (a characteristic approximating the constant feeding force characteristic), and the wire feeding rate has been set by the feed motor having a small drooping degree, while the feed motor having a large drooping degree has been used by previously setting it at a predetermined operational characteristic line $M_2$ or $M_2'$.

Furthermore, the wire feeding force of the motor of a small drooping degree is usually about 4–10 times greater than that of the motor of a large drooping degree.

As such, in the case of selecting a characteristic approximating the constant feeding force characteristic for one of the feed motors, if the necessary wire feeding force is varied, such variation will be almost entirely borne by the feed motor having a characteristic approximating the constant speed characteristic.

Generally, the feed motor having a characteristic of a large drooping degree approximating the constant feeding force characteristic is located interior of or adjacent to the torch, and the feed motor having a characteristic of a small drooping degree approximating the constant speed characteristic is located adjacent to the wire reel. Therefore, an increase in the necessary wire feeding force is imparted to the wire as an increased wire inserting force.

A wire of small diameter is strong against tension but weak against an axial pushing force and is susceptible to buckling. Therefore, the application of an excessively large inserting force has resulted in buckling of the wire, which is not only detrimental to the passage of the wire through the guide tubes but also presents the possibility that the feed motor controlling elements overloaded.

The present invention has been made with a view to eliminating such drawbacks of the conventional apparatus. A practical embodiment of the welding apparatus according to the present invention is shown in FIG. 3 and the relationship between the wire feeding force and the wire feeding rate of the apparatus is shown in FIG. 4.

Figure 3:
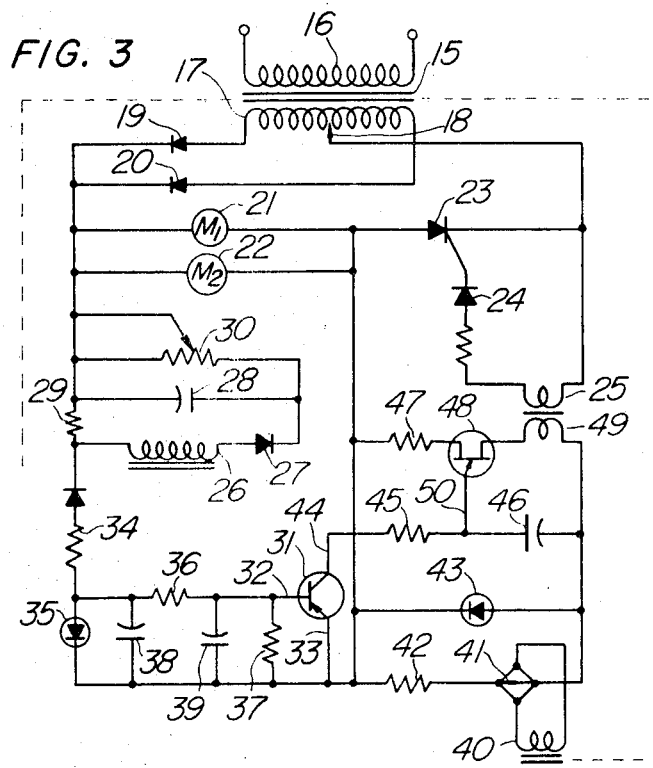
FIG. 3 is a circuit diagram of an embodiment of the welding apparatus according to the present invention.
Figure 4:
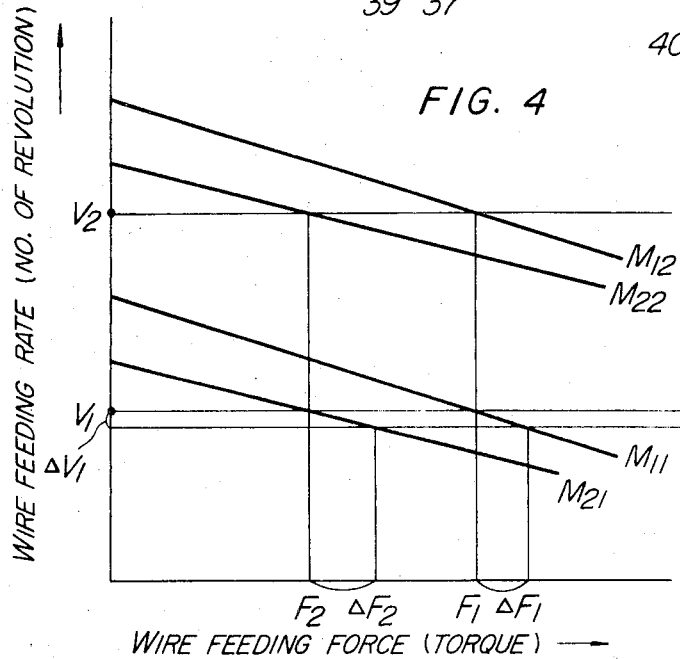
FIG. 4 is a diagram showing the relationship between the wire feeding force and the wire feeding rate in the welding apparatus of the present invention.

Referring first to FIG. 3, numeral 15 designates a control power transformer having a primary coil 16; 17 a secondary coil of said transformer 15 having a neutral point 18; 19, 20 rectifier diodes; 21 a first feed motor; 22 a second feed motor; 23 a silicon controlled rectifier; 24 a reverse voltage preventing diode inserted in a gate circuit of said silicon controlled rectifier 23; and 25 a pulse generating transformer.

Where a third feed motor is necessary, such may be connected in parallel with the first feed motor 21 and the second feed motor 22. Numerals 26, 27, 28 and 29 designate a transformer, a diode, a capacitor and a resistor respectively of a reference voltage circuit; and numeral 30 designates a reference voltage adjusting resistor by which a wire feeding rate is set. Across resistor 30 is developed a voltage in a direction opposite to the direction of the induction voltages of the motors 21, 22, and a difference between said voltage and the higher one of the induction voltages of the motors 21, 22 is impressed across the base 32 and the emitter 33 of a transistor 31 through an overvoltage protecting circuit, consisting of a resistor 34 and a Zener diode 35, and a smoothing and stabilizing circuit consisting of resistors 36, 37 and capacitors 38, 39. Numerals 40, 41, 41 and 43 designate a transformer, a diode, a resistor and a Zener diode respectively of a pulse generating source circuit and a rectangular wave is generated across the opposite ends of the Zener diode 43. The emitter 33 and the collector 44 of the transistor 31, a resistor 45 and a pulse generating capacitor 46 are connected in series with each other and connected in parallel with the Zener diode 43.

A resistor 47, a uni-junction transistor (hereinafter abbreviated as UJT) 48 and the primary coil 49 of a pulse generating transformer are connected in series and the series circuit thus formed connected with the opposite ends of the Zener diode 43. The emitter 50 of the UJT 48 is connected to one terminal of the capacitor 46 as shown.

The relationship between the wire feeding force and the wire feeding rate, obtained by the circuit of FIG. 3, is as shown in FIG. 4, and the wire feeding rate is controlled in the following manner: Suppose that the voltage of the resistor 30 is set at $E_r$ and the higher one of the induction voltages of the wire feed motors 21, 22 is $E_M$. When $E_r - E_M$ is smoothed and impressed across the base 32 and the emitter 33 of the transistor 31, the impedance Z of the transistor 31 is varied according to the value of said differential voltage and the charging rate of the capacitor 46 is also varied. When the terminal voltage of the capacitor 46 has reached the peak voltage of the UJT 48, the charge stored in the capacitor 46 is instantaneously discharged through the primary coil 49 of the transformer 25. In this case, a pulse is generated in the secondary coil and the gate of the silicon controlled rectifier 23 is triggered by said pulse. Thus, the silicon controlled rectifier 23 is ignited. When $E_r - E_M$ is large, the striking phase of the arc is advanced, with the rates of rotation of the motors 21, 22 increasing, whereas when the same is small, the striking phase of the arc is delayed with the rates of rotation of said motors decreasing.

Although the rotational speeds of the first feed motor 21 and the second feed motor 22 are controlled in the manner described, they tend to lower as the mechanical load, imposed on the respective motors, increases. This is not only because each motor itself has such a characteristic that the number of revolutions thereof tends to decrease as the load increases, but also because the control circuit of FIG. 3 also has such an operational characteristic that $E_r - E_M$ must be made large for giving a large input to the motor.

Referring now to FIG. 4, the voltages impressed on the first feed motor 21 and the second feed motor 22 are always the same because these motors are connected in parallel with each other. Let it be supposed that the operational characteristic line of the first feed motor 21 is set at $M_{11}$ and that of the second feed motor 22 at $M_{21}$.

If a total force of F is required for feeding the wire under such conditions, F is divided into $F_1$, a share taken by the first feed motor 21, and $F_2$, a share taken by the second feed motor 22, and the share ratio is determined by the relation between $M_{11}$ and $M_{12}$.

Namely, if the operational characteristic lines $M_{11}$ and $M_{21}$ are approximately represented by the equations $V_{M_{11}} = A_1 - B_1 F_1$ (expression of relation between the wire feeding rate $V_{M_{11}}$ and the wire feeding force $F_1$ on one operational characteristic line)

$V_{M_{12}} = A_2 - B_2 F_2$ (expression of relation between the wire feeding rate $V_{M_{12}}$ and the wire feeding force $F_2$ on another operational characteristic line), wherein $A_1$, $A_2$, $B_1$ and $B_2$ each are constants, $F_1$, $F_2$ and $V_1$ are determined under conditions of $F_1 + F_2 = F$
$A_1 - B_1 F_1 = A_2 - B_2 F_2 = V_1$ wherein $V_1$ is the feeding rate of the wire when the wire is fed by the first feed motor 21 and the second feed motor 22 being in an equilibrium state.

When the force F necessary for feeding the wire is increased by $\Delta F$ in FIG. 4, the wire feeding rate is decreased by $\Delta V_1$ and the wire feeding force of the first feed motor is increased by $\Delta F_1$ and that of the second feed motor by $\Delta F_2$, the result being that $\Delta F = \Delta F_1 + \Delta F_2$. Thus, the first and second feed motors are again placed in an equilibrium state. The drooping degrees of $M_{11}$ and $M_{21}$ are so selected that the value of $\Delta V_1$ will not have a substantial effect on the welding operation.

For adjusting the wire feeding rate, the operational characteristic lines of the first and second feed motors are set at $M_{12}$ and $M_{22}$ respectively by adjusting the resistance value of the resistor 30 in FIG. 3, whereby a wire feeding rate of $V_2$ is obtained when the wire feeding force F is $F_1 + F_2$. The relationship between the wire feeding force and the wire feeding rate of either one of these two motors is not restricted to that shown in FIG. 4 but the drooping degree of the characteristic line may optionally be set to some extent and a rising characteristic may even be employed. In case of the latter, however, stable control of the wire feeding becomes difficult. In this event, the drooping degree of the characteristic line of the motor is made substantially the same as that of the other motor and by so doing it is possible to control the wire feeding with the highest stability.

Although the invention has been described in terms of a particular embodiment wherein the wire is fed at a substantially constant rate, it should be understood that the apparatus of the invention may be designed so that the wire feeding rate can be increased or decreased according to the value of the arc voltage, by arranging such that the arc voltage or a voltage in proportion to the arc voltage may be impressed in place of the secondary coil 26 of the transformer in the circuit of FIG. 3.

The embodiment shown in FIG. 3 is only illustrative, and the same effect may also be obtained by employing, in lieu of the silicon controlled rectifier system, a system using a magnetic amplifier or an electron tube.

In the prior art apparatus, the feeding force imparted to the wire by the second feed motor is substantially constant and is neither increased nor decreased commensurate with a change in the force required for feeding the wire, the first feed motor only being responsive to such a change.

With such apparatus, the feeding force of the secondary feed motor occasionally decreases to too low a value, so that it not only has become impossible to increase the length of the second guide tube but in some instances it has been necessary to connect the first feed motor directly with the contact tip of the torch or a contact tip fixture, without providing the second guide tube. Moreover, since the wire pushing force of the first feed motor only is increased, the wire tends to be buckled at the entrance end of the first guide tube, necessitating a greater feeding force.

In passing a wire through a guide tube of the same length and curvature, the wire can be passed through the guide tube much easier by pulling it than by pushing it. It is known that where a pushing force, for example, of 70 kg is required for passing a wire through a guide tube, a force of only about 15-20 kg is sufficient for passing the wire through the same guide tube by pulling it.

In the prior art apparatus, the wire passing force is supplemented solely by a pushing force when the force required for feeding the wire has increased due to an increased difficulty in feeding the wire caused as by an increase in the bending degree of the guide tube. Therefore, not only has a great pushing force been required for achieving a stable feeding of the wire, but also there has been the fear of the wire being buckled and hence satisfactory wire feeding has not always been attained.

In the apparatus of the present invention, as contrasted thereto, the feeding forces of both the first and second feed motors are increased commensurate with an increase in the force required for feeding the wire (wire feeding load). Therefore, the wire passing through the first guide tube is subject to not only an increasing pushing force but also an increasing pulling force, which prevents the wire from buckling more effectively and facilitates feeding of the wire. According to the present invention, therefore, it is possible to increase the length of the first guide tube and hence the radius of movable range of the welding torch can be increased and the maneuverability of the apparatus can be improved.

In FIG. 4, a motor having a greater feeding force is used as the first feed motor but this need not always be the case. Namely, satisfactory operation can also be obtained by using a motor having the characteristic represented by $M_{11}$ in FIG. 4 as the second feed motor and a motor the characteristic represented by $M_{21}$ as the first feed motor. Further, satisfactory operation can be obtained by locating the motor 21, shown in FIG. 3, in a position closer to the torch and the motor 22 in a position closer to the wire reel.

The relative position and characteristic of these motors may be selected so as to be suited to a particular apparatus embodying the present invention. For instance, where the second feed motor is to be accommodated in the welding torch, it must be small in size, compact in form and light in weight. Therefore, a motor is used as the second feed motor which is smaller in feeding force than the first feed motor and has a characteristic as shown in FIG. 4 relative to that of the first feed motor. On the other hand, where the second feed motor is to be located closer to the torch between the first and second guide tubes, it is not subject to such a limitation with respect to weight and size. Therefore, the wire feeding force of the second feed motor can be made large and may even be larger than that of the first feed motor. This is rather advantageous in that smooth wire feeding can be more easily obtained because the wire pulling force becomes larger.

As may be understood from the foregoing, the welding apparatus of this invention is of great advantage in that smooth wire feeding can be obtained even when the length of the guide tube is increased, and also in that it is adaptable to a wide range of applications.

Speaking more specifically, it has been revealed that according to the present invention wherein both the first feed motor and the second feed motor which are substantially the same in drooping degree of the characteristic lines thereof participate in the setting of a wire feeding rate and their shares of feeding force are substantially increased according to an increase in the feeding load, the apparatus is serviceable for practical use, with a wire of 1.2 mm or 1.6 mm in diameter, even when the first guide tube is 30 m and the second guide tube is 3 m in length. In contrast thereto, when motors of the same specification as those mentioned in the present invention were used in the conventional apparatus as the first and second feed motors respectively, the apparatus was not serviceable for practical welding operations at a welding site due to failure in smooth feeding of the wire and excessive bending of the first guide tube when the length of the first guide tube exceeded 15 m and that of the second guide tube exceeded 3 m.

For any speed setting, the best effect is obtained when the motors used have substantially the same drooping degree (of the speed vs. load characteristic). Where the drooping degrees are not the same, the load sharing effect of the two motors with respect to an increasing feeding load is great when the drooping degree of one motor is 3 or smaller relative to 1 of the other motor, and an appreciable effect can be obtained when the drooping degree of one motor is up to 5 relative to 1 of the other motor. Where the drooping degrees of the motors are not the same or varied from each other intentionally, feeding of the wire can be attained more efficiently when the motor of greater drooping degree is used as the first feed motor and the motor of the smaller drooping degree as the second feed motor. It will be obvious, however, that in practice the relative characteristic and position of these motors should be determined in consideration of the conditions corresponding to the size, weight and manner of use of the motors.

As has been described above, in the semi-automatic or automatic welding apparatus according to the present invention two or more motors, each having a wire feeding force vs. wire feeding rate characteristic of small drooping degree, i.e., a characteristic approximating to the constant speed characteristic, are connected with each other in parallel relation for feeding a consumable welding electrode wire, so that the load shares taken by the individual motors may be substantially increased as the wire feeding load increases. Therefore, efficient smooth wire feeding is ensured, even when the wire guide tubes are long, and hence the apparatus of the invention is adapted to a wide range of practical applications. Thus, the present invention is of great industrial advantage.

What is claimed is:

1. Apparatus for use in welding a work piece by an electric arc produced between a consumable welding electrode and the work piece, said apparatus comprising: a consumable welding electrode wire; a path along which said electrode wire is fed towards said work piece; at least two means for feeding said electrode wire along said path, said feeding means being located at two remote positions along said path of said electrode wire; two motors for driving said two feeding means, respectively, said two motors having substantially the same drooping, approximate to a constant speed, characteristics; and means for controlling said two motors, said means comprising an AC power source, a motor circuit for connecting said two motors in parallel, a controlled rectifier connected between said power source and said motor circuit, a circuit for producing a desired reference voltage, and means for controlling the conduction of said controlled rectifier responsive to the difference between said reference voltage and a voltage induced across said motor circuit.

2. A welding apparatus according to claim 1, wherein said reference voltage is variable in accordance with variation of a voltage developed across said circuit.

* * * * *